United States Patent [19]

Yoshida et al.

[11] 4,216,118

[45] Aug. 5, 1980

[54] PROCESS FOR RECOVERING VANADIUM ACCUMULATED ON SPENT CATALYST

[75] Inventors: Takechiyo Yoshida, Tokyo; Masato Ushiyama, Ebina; Tohru Yokoyama, Yokohama, all of Japan

[73] Assignee: Chiyoda Chemical Engineering & Construction Co., Ltd., Yokohama, Japan

[21] Appl. No.: 870,985

[22] Filed: Jan. 20, 1978

[30] Foreign Application Priority Data

Jan. 20, 1977 [JP] Japan .................................. 52-4362

[51] Int. Cl.² .......................... B01J 23/90; B01J 23/92
[52] U.S. Cl. .................. 252/415; 252/411 R; 252/412; 252/413; 423/62; 423/492
[58] Field of Search .............. 252/415, 411, 412, 413; 423/62, 492

[56] References Cited

U.S. PATENT DOCUMENTS

| | | | |
|---|---|---|---|
| 3,122,510 | 2/1964 | Burk, Jr. et al. | 252/415 |
| 3,395,974 | 8/1968 | Swimton | 423/492 |
| 3,494,728 | 2/1970 | Letson | 423/492 |
| 4,013,546 | 3/1977 | Suggitt et al. | 252/419 |
| 4,101,444 | 7/1978 | Burk et al. | 252/411 R |

FOREIGN PATENT DOCUMENTS

| | | | |
|---|---|---|---|
| 1040723 | 3/1959 | Fed. Rep. of Germany . | |
| 47-21387 | 10/1972 | Japan . | |
| 50-11995 | 6/1973 | Japan . | |
| 50-75185 | 6/1975 | Japan . | |
| 52-5436 | 2/1977 | Japan . | |
| 1093973 | 12/1967 | United Kingdom | 252/415 |

*Primary Examiner*—Patrick Garvin
*Attorney, Agent, or Firm*—Armstrong, Nikaido, Marmelstein & Kubovcik

[57] ABSTRACT

This invention relates to a process for selectively recovering vanadium from spent catalysts which were used in hydrodesulufurization, hydrodemetallization, etc. of heavy oils until metals in said heavy oils accumulated thereon. More particularly, it relates to a process for recovering vanadium, and if desired, vanadium along with nickel from spent catalysts in such a way that said spent catalysts are chlorinated with chlorinating agent(s) at a temperature below 600° C. without being subjected to calcination so as to convert almost all the vanadium compounds to vanadium tetrachloride which is recovered in the form of a gas, including the chlorination of nickel compounds of nickel chloride which can also be recovered as such by solvent extraction.

20 Claims, 4 Drawing Figures

PROCESS FOR RECOVERING VANADIUM ACCUMULATED ON SPENT CATALYST

BACKGROUND OF THE INVENTION

1. Field of the Invention

At present, crude oils and heavy oils are mainly used as fuel, but in accordance with the air pollution control legislation or regulations oils that contain sulfur as well as heavy metals in high concentrations cannot be used unless they are subjected to hydrodesulfurization, hydrodemetallization, exhaust gas desulfurization, or the like. Most of crude oils, though somewhat different depending on their sources, contain vanadium and nickel mainly in the form of porphyrin compounds. Usually the reaction conditions of hydrodesulfurization and hydrodemetallization are such that the reaction pressure ranges from 70 to 140 Kg/cm$^2$G and the reaction temperature ranges from 350° C. to 450° C. The vanadium and nickel in oils enter into reaction and accumulate in pores of catalysts. These catalysts are as large as about 0.5 cm to about 1.0 cm in length and about 1/32 inch to 1/16 inch in diameter. These catalysts usually are synthetic gel based catalysts and clays, that is, they are made by desorption of molybdenum, nickel and/or cobalt etc, from a solution or slurry of salts of these metals on a carrier such as silica, alumina; silica-aluminum or silica-magnesia etc. It is well known that as a result the catalytic activity is considerably lowered, and therefore it is no exaggeration to say that the life of catalyst is almost always determined by the amount of the accumulated vanadium, nickel, etc. For this reason the use of oils containing large amounts of metals is restricted. The metal content in crude oils largely differs depending on the oil-producing district, and it attains as high as 1,500 ppm in Venezuela crude oil. But, as, on the other hand, vanadium and nickel are valuable metallic raw materials, it is our present situation that we cannot overlook these highly metal-containing oils as the recovery source of valuable metals from the viewpoint of utilization of resources. In particular, vanadium is one of the most promising raw materials along with niobium in its high degree of utilization in future, and not only is it now in the limelight as the raw material of high tensile steel, the coating material of nuclear reactor, the super conduction material, etc., but also it is in wide use as the catalysts in various chemical industries as well as petroleum industry, the coloring agent for glass, the additive to titanium alloy, etc. Nickel is also in wide use as the raw material of special steels, stainless steels, etc. so that it is one of the valuable raw materials comparable to vanadium. Thus, in view of the limited production of these metals, it is of extreme importance that vanadium and nickel are recovered from these highly metal-containing oils for the purpose of utilizing resources.

Recently, in spent catalysts for desulfurization and demetallization which were used in the hydrogenation treatment of heavy oils that is in actual practice as one of the preventive methods for public nuisance such as air pollution, etc., the concentration of vanadium on spent catalyst is as high as 0.20–50% by weight, and the concentration of nickel is also as high as 0.10–15% by weight, so that it may be mentioned that these spent catalysts are high grade ores that are not found in nature.

2. Description of the Prior Art

As the process for selective removal of metals such as vanadium, nickel, molybdenum, etc. from spent catalysts there have been proposed several processes for selective extraction using ammonium sulfide (German Pat. No. 1,040,723) or glycolic acid, oxalic acid, etc. (U.S. Pat. Nos. 3,020,239 and 3,791,989) or an alkali (Japanese Application Disclosure No. 75,185/1975) and so on, and in addition to them, as the process for regeneration of catalysts in fluidized catalytic cracking deactivated by the accumulation of these metals there are known U.S. Pat. Nos. 3,122,510; 2,488,744; 3,147,209; 3,122,511; 2,481,253; and 3,234,145.

Also, as the process for recovering the above described valuable metals from spent catalysts there may be mentioned a process for extraction by an alkali (Japanese Application Disclosure Nos. 5,436/1977 and 11,995/1975), a process for extraction by ammonia (Japanese Application Disclosure No. 21,387/1972), etc.

All of these processes involve the technique of either removing vanadium or nickel after the spent catalysts have been subjected to oxidizing calcination so as to remove carbonaceous material, or regenerating the catalyst in high yield after the above described removal of vanadium and nickel. In these processes the vanadium, that is the object of the recovery, is converted to oxide (or oxides) on the catalyst by the oxidizing calcination, so that by chlorination, the greater part of it is converted to VOCl$_3$ while very little VCl$_4$ is formed. Moreover, in such a case, because of the comparatively large stability of the vanadium oxide the chlorination temperature should be higher than 600° C. to recover almost all of vanadium accumulated on spent catalysts, but when the chlorination temperature exceeds 600° C., the layer such as molybdenum and the carrier of the catalyst is also chlorinated and makes difficult the separation of metals for recovery.

SUMMARY OF THE INVENTION

The present inventors, who were investigating the process for recovering vanadium chlorides and nickel chloride from the spent catalysts that were used in these hydrogenation reactions, discovered that the vanadium and nickel accumulated on catalysts are mainly in the form of sulfides that have been gradually formed at high temperatures and high hydrogen pressures as well as under an atmosphere of hydrogen sulfide. Based on this new discovery, they could immediately succeed in that without subjecting the spent catalysts to oxidation treatment, the vanadium in the spent catalysts can be reacted directly with chlorinating agent(s) at a temperature of from room temperature to 600° C., which is much lower than the temperature usually employed in the conventional process of chlorinating the spent catalyst subjected to oxidation treatment, under a reaction pressure above atmospheric pressure to form only volatile vanadium tetrachloride which is readily capable of separation from other chlorides such as MoCl$_5$, FeCl$_3$, AlCl$_3$, S$_2$Cl$_2$ etc., and at the same time the nickel can also form water-soluble nickel chloride which is readily capable of liquid-solid separation, and thus a novel process for selective recovery of vanadium and nickel could be established.

The process of this invention is outstandingly characterized by that the spent catalysts are directly chlorinated without subjecting them to calcination, in which case the chlorination which is carried out without calcination is not only for the purpose of mere simplification of the process, but also for the distinguished effect in the recovery of vanadium and nickel, since the vanadium and nickel accumulated on the catalyst are almost in the form of sulfides.

Heretofore, with regard to spent catalysts that were used in hydrogenation treatment such as hydrocatalytic cracking, hydrodesulfurization, hydrodemetallization, etc. various investigations, patents, etc. have been proposed with the object of regenerating them. But in most of these investigations, patents, etc. the spent catalysts are calcined in the pretreatment step for the purpose of removing the carboneous material that have accumulated or adhered on the spent catalysts. For instance, in fluidized catalytic cracking the catalysts poisoned with V, Ni, etc. are usually subjected to oxidizing calcination at 600°–650° C. in the apparatus prior to their regeneration. When considering from the standpoint of metal recovery, however, the calcination is not desirable for the following reasons:

(a) The highly reactive compounds of vanadium and nickel that have accumulated on the spent catalysts are stabilized as oxides.

(b) Vanadium oxy compounds are formed as main products, and as a result the purity of metals decreases.

(c) The moisture which is formed at the time of oxidation generates chloride ion which gives rise to corrosion of apparatus.

The above described reasons will be explained more fully below.

Figure 1:
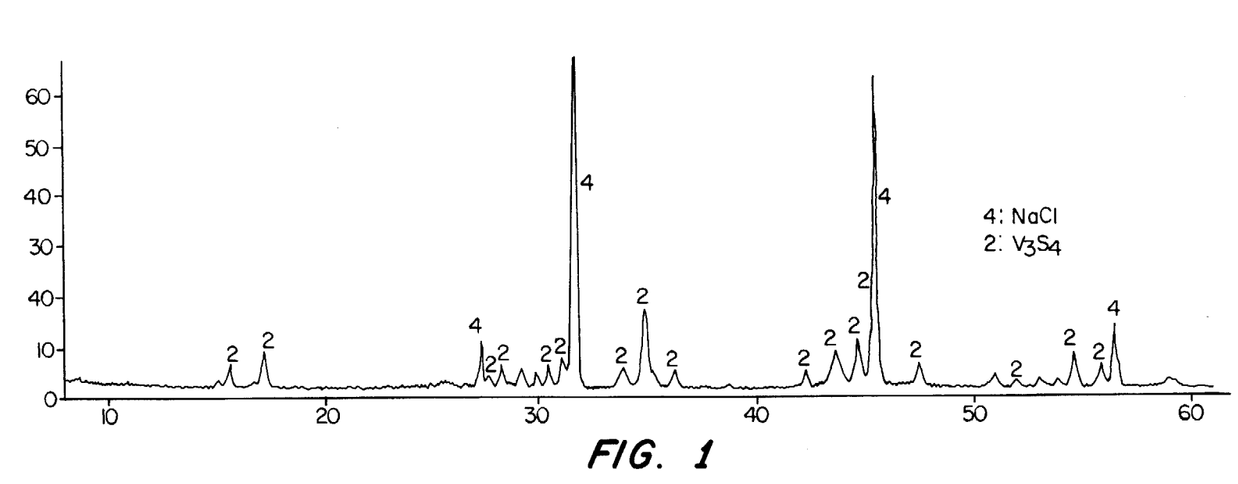
FIG. 1 indicates one of the x-ray diffraction patterns of the vanadium sulfide identified as $V_3S_4$ which has accumulated on a catalyst when Gach-saran topped bottom has been hydrogenated in the presence of demetallization catalyst.

As to (a): The vanadium and nickel accumulated on spent catalysts are present in the form of sulfides. FIG. 1 indicates one of the X-ray diffraction patterns of the vanadium sulfide identified as $V_3S_4$ which has accumulated on catalyst when Gach-saran topped bottom has been hydrogenated in the presence of a demetallization catalyst under the following conditions:

Reaction pressure: 140 Kg/cm$^2$
Reaction temperature: 415° C.
Liquid hourly space velocity: 0.5 hr$^{-1}$
Reaction time: 6,000 hr We found if calcined, the sulfides become oxides which are stable, so that not only does the chlorination require a reaction temperature above 600° C., but also even the catalyst carrier is chlorinated and the purity of vanadium chlorides and nickel chloride is markedly lowered. Also, when the calcination temperature exceeds 690° C., vanadium pentoxide melts and reacts with catalyst carrier to be stabilized. Since in this invention no oxidation treatment is involved, the accumulated vanadium and nickel can be chlorinated in a satisfactory manner even below 200° C. Thus, in accordance with this invention it became possible to selectively recover the vanadium and nickel accumulated on catalyst at much lower temperatures with the former being recovered only in the form of vanadium tetrachloride and without chlorinating catalyst carrier such as silica, alumina, etc.

As to (b): When vanadium pentoxide is chlorinated in admixture with active charcoal, there are formed vanadium oxytrichloride and vanadium tetrachloride. Below 500° C. vanadium oxytrichloride is produced mainly while vanadium tetrachloride is formed only in an amount lower than 10%. On the other hand, when carrying out chlorination above 750° C. vanadium tetrachloride becomes the main product forming 5% of vanadium oxytrichloride. Vanadium oxytrichloride is not desirable for the following reason. That is, when vanadium metal is contaminated with more than 0.1% by weight of oxygen it can hardly be subjected to cold working, and moreover, its Rockwell hardness considerably decreases. Nevertheless, it is very difficult to fractionate vanadium oxytrichloride and vanadium tetrachloride. Although the boiling points of vanadium oxytrichloride and vanadium tetrachloride are respectively 127° C. and 160° C. showing a difference of 33° C., they cannot be separated from each other by distillation. This is due to the fact that vanadium trichloride readily solidifies within the boiling range of vanadium tetrachloride and the distillation tower is plugged with the vanadium trichloride deposited therein, so that its continuous operation is rendered impossible, except the case where a distillation under chlorine pressure is carried out as later described. Although they have also by about 50° C. different melting points, because of the formation of their complex compound, the separation utilizing this difference in the melting point may not be free from technical difficulties.

In this invention there is formed only vanadium tetrachloride which is readily capable of separation even when other metal chlorides such as $S_2Cl_2$, $FeCl_3$, $MoCl_5$, $AlCl_3$ are formed and present, so that the vanadium metal can be obtained in high purity. So far as the regeneration of catalyst is concerned, the object of recovering vanadium may be achieved even though the vanadium tetrachloride obtained may contain vanadium oxytrichloride if no recovery of vanadium as metal is intended, but the vanadium oxytrichloride is not desirable if the recovery of vanadium as valuable metal is intended.

As to (c): The moisture which is formed when spent catalyst is oxidized generates free chloride ion which gives rise to corrosion of apparatus.

In this invention, however, since the reaction temperature is low, there is no problem of corrosion of apparatus such as usually encountered in chlorination process.

Next, the process of this invention will be explained in more detail in the sequence of the steps.

The spent catalysts which are the subject of the treatment in the process of this invention are preferably washed with a solvent such as carbon tetrachloride, benzene, kerosene, etc. so as to remove the reactant oil as well as light oil adhered on said catalysts, and further the residual oil is purged by the aid of a gas such as nitrogen or hydrogen, etc. before the chlorination is carried out. The washing of the spent catalyst and the purging of the residual oil are not necessary to the chlorination of metals on said spent catalyst, but have the object of preventing the formation of hydrochloric acid vapor resulting from the partial chlorination of the light hydrocarbon compounds adhering on the spent catalyst during the course of the chlorination of metals at high temperature. Accordingly, even when the washing and the purging of the residual oil are omitted, the chlorination of metals can proceed.

The spent catalyst, of which the pretreatment has ended, is then transferred to a sealed vessel, where it is contacted with chlorinating agent(s) introduced in said sealed vessel under the reaction conditions of a pressure above atmospheric pressure and a temperature of from room temperature to 600° C., so that the vanadium and nickel of the metals accumulated on said spent catalyst are selectively chlorinated to be converted to vanadium tetrachloride and nickel chloride, respectively. Usually a dried chlorinating agent is used under a pressure above atmospheric together with a gas which is essentially inert to said chlorinating agent. The inert gas used herein is preferably a gas such as nitrogen, helium, etc. When a chlorinating agent is used in the form of a gas its partial pressure need not be above atmospheric. The chlorination reaction proceeds considerably violently. The reaction temperature condition is set up so that the upper limit of the reaction temperature is within the temperature range in which the catalyst carrier is not substantially chlorinated. Molybdenum, which is one of the metals supported on carrier begins to be chlorinated at 150° C. and substantially all of it is chlorinated at 400° C. Iron, which is either one of the metals accumulated or a metal coming from the rust of apparatus, etc. begins to be chlorinated at 200° C., and this metal is also almost completely chlorinated at about 400° C. On the other hand alumina in carrier, which begins to be chlorinated at 300° C. is almost completely chlorinated at 450° C., whereas silica is susceptible to almost no chlorination until 500°–600° C. At all events when catalyst carrier is chlorinated the purity of the vanadium and nickel recovered decreases.

As shown by the result obtained in the later described example the spent catalysts show a considerable difference in their reactivity toward a chlorinating agent according to whether they are so-called spent hydrodesulfurization catalyst or spent demetallization catalyst, because of the difference in the form of the vanadium sulfide accumulated on the respective catalysts. That is to say, the result indicates that in the case of spent hydrodemetallization catalyst the rates of recovery of vanadium and nickel at a chlorination temperature of 100° C. are respectively 84% and 80%, while in the case of spent hydrodesulfurization catalyst these rates at a chlorination temperature of 200° C. are respectively 54% and 94%. In view of this result it will be obvious that in the process of this invention vanadium and nickel can be recovered in highest yields by setting up the optimum conditions depending on the nature of the spent catalyst. When considering the characteristics of the carrier, the desirable chlorination temperature range is from room temperature to 200° C. for hydrodemetallization catalysts and 100°–300° C. for hydrodesulfurization catalysts.

Figure 2:
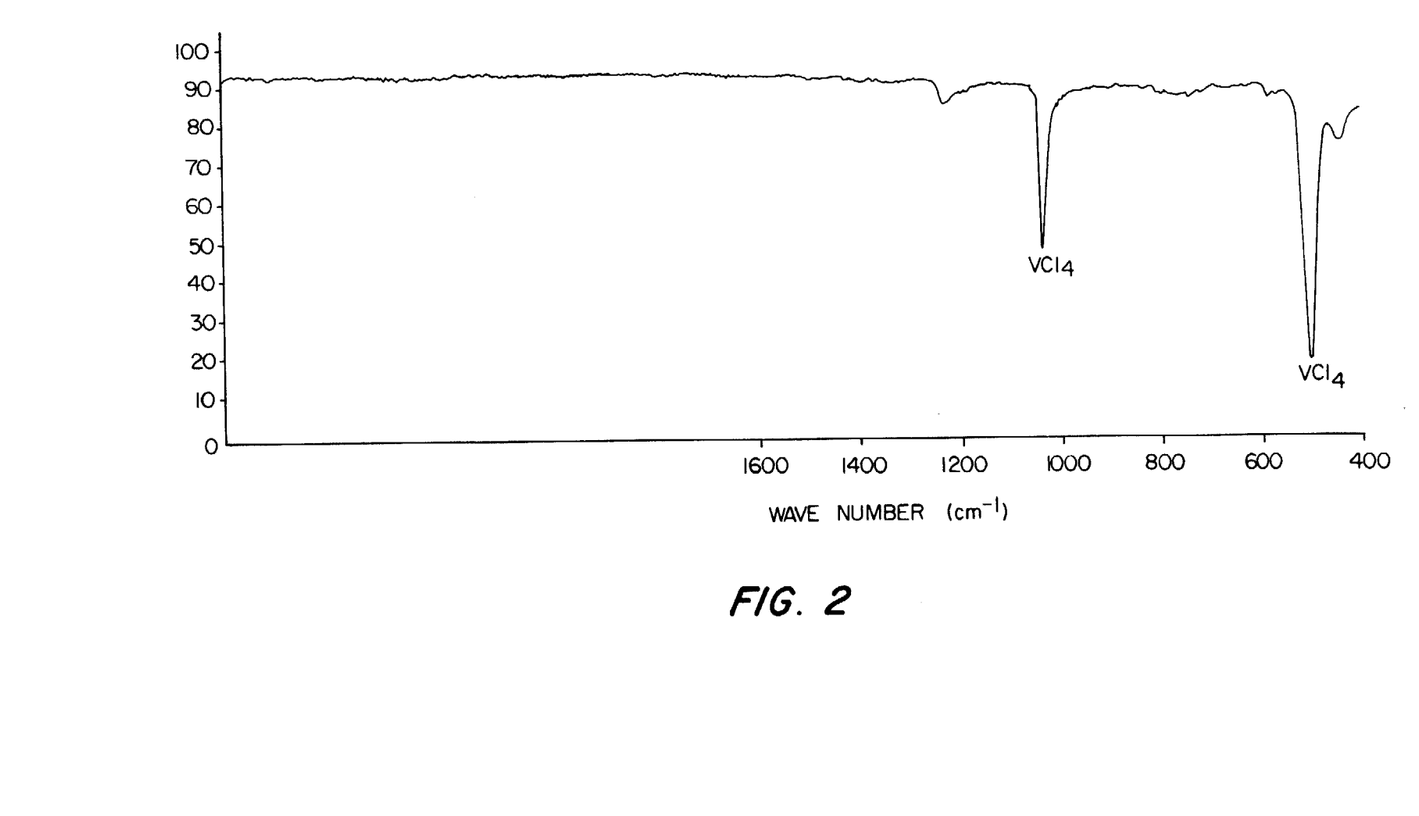
FIG. 2 indicates the result of the IR absorption spectrum investigation with respect to a liquid which was separated by liquefaction after chlorination was carried out at about 100° C.

Vanadium tetrachloride can be subjected to vapor-solid separation when vaporized. The recovered vapor is liquefied by cooling and then separated from chlorine gas. In the case where chlorination is carried out at a low temperature below 200° C., the metal component in the recovered vapor is almost exclusively vanadium tetrachloride and disulfur dichloride as by-product, but in the case where the reaction temperature is higher than 300° C., it happens that in addition to molybdenum chloride, aluminum chloride and iron chloride are also accompanied. These compounds, however, can be readily separated. For instance, unreacted chlorine gas is first separated by gas-liquid separation when liquefied by cooling to a temperature below the boiling point of vanadium tetrachloride, and then the chlorides of Mo, Al, and Fe are successively separated by solid-liquid separation according to the prior known art such as stepwise cooling. Or alternatively, vanadium trichloride can be directly recovered by gas-liquid separation when the vanadium tetrachloride is subjected to thermal decomposition by bringing the recovered vapor to a temperature predetermined as the thermal decomposition temperature corresponding to the partial pressure of the chlorine coexistent. Such vanadium tetrachloride is considerably unstable, in the step of such thermal decomposition, the above described other chlorides can also be readily separated. FIG. 2 indicates the result of the IR absorption spectrum investigation with respect to a liquid which was separated by liquefaction after the chlorination was carried out at about 100° C. In the figure it is found that all the vanadium is in the form of vanadium tetrachloride. The above described chlorine gas separated by liquefaction is circulated for reuse. On the other hand, nickel chloride is formed on the spent catalyst, so that the reacted spent catalyst is transferred to another vessel, where water or other polar solvents, including alcohols such as ethanol, esters such as methyl acetate, amines such as monoethanolamine, and nitriles, are added to form a solution of nickel chloride which is subjected to liquid-solid separation.

The compounds of vanadium and nickel thus recovered and further recovered as metallic vanadium and nickel according to the prior known molten salt electrolytic process, etc.

The characteristic features of the process of this invention may be enumerated as follows.
(i) Vanadium chloride and nickel chloride can be obtained in high purity.
(ii) Manufacturing steps are simplified.
(iii) Operation is easy because of the reaction being of flow type, and the enlargement of apparatus is also possible.
(iv) Since chlorine, etc. are capable of reuse, almost closed system is applicable without any danger of public nuisance.

The spent catalysts which are regarded as the subject of the treatment in the process of this invention are those which have been used in hydrodesulfurization, hydrodemetallization, hydrocracking. Of these spent catalysts, as to the one from FCC process, it is well known that 1–2% by weight of vanadium, nickel or iron accumulated on the catalyst alters the character of said catalyst and the pattern of cracking reaction, to produce higher yields of coke and hydrogen at the expense of aimed products, such as gasoline, so that such a catalyst is withdrawn usually at the stage of about 1% by weight accumulation, and no efficient recovery of metals cannot be expected from it. Also, in FCC process the catalyst is discharged from the catalytic cracking tower usually after the carbonaceous material adhering thereon has been burnt-off continuously in the apparatus, so that the vanadium and nickel contained in the spent catalyst thus discharged from the apparatus are always in the form of oxides, and therefore there will be no merit in applying the process of this invention to such a catalyst unless a novel process for regeneration is devised which involves no oxidation treatment.

The process of this invention may be applicable to any spent hydrodesulfurization, hydrodemetallization catalysts that are discharged from any of reactors of fixed bed type, of fluidized bed type, or of moving bed type, but it is desirable that use is made of a reactor of fluidized bed type or of moving bed type so that the spent catalyst can be transported directly to an apparatus for metal recovery from the viewpoints that the spent catalyst can be recovered in a continuous manner without the interruption of the operation of apparatus and the spent catalyst can be prevented from oxidation.

As the chlorinating agent use can be made of any of chlorine, hydrogen chloride, carbon tetrachloride, $S_2Cl_2$, or the like.

DETAILED DESCRIPTION OF THE INVENTION

Figure 3:
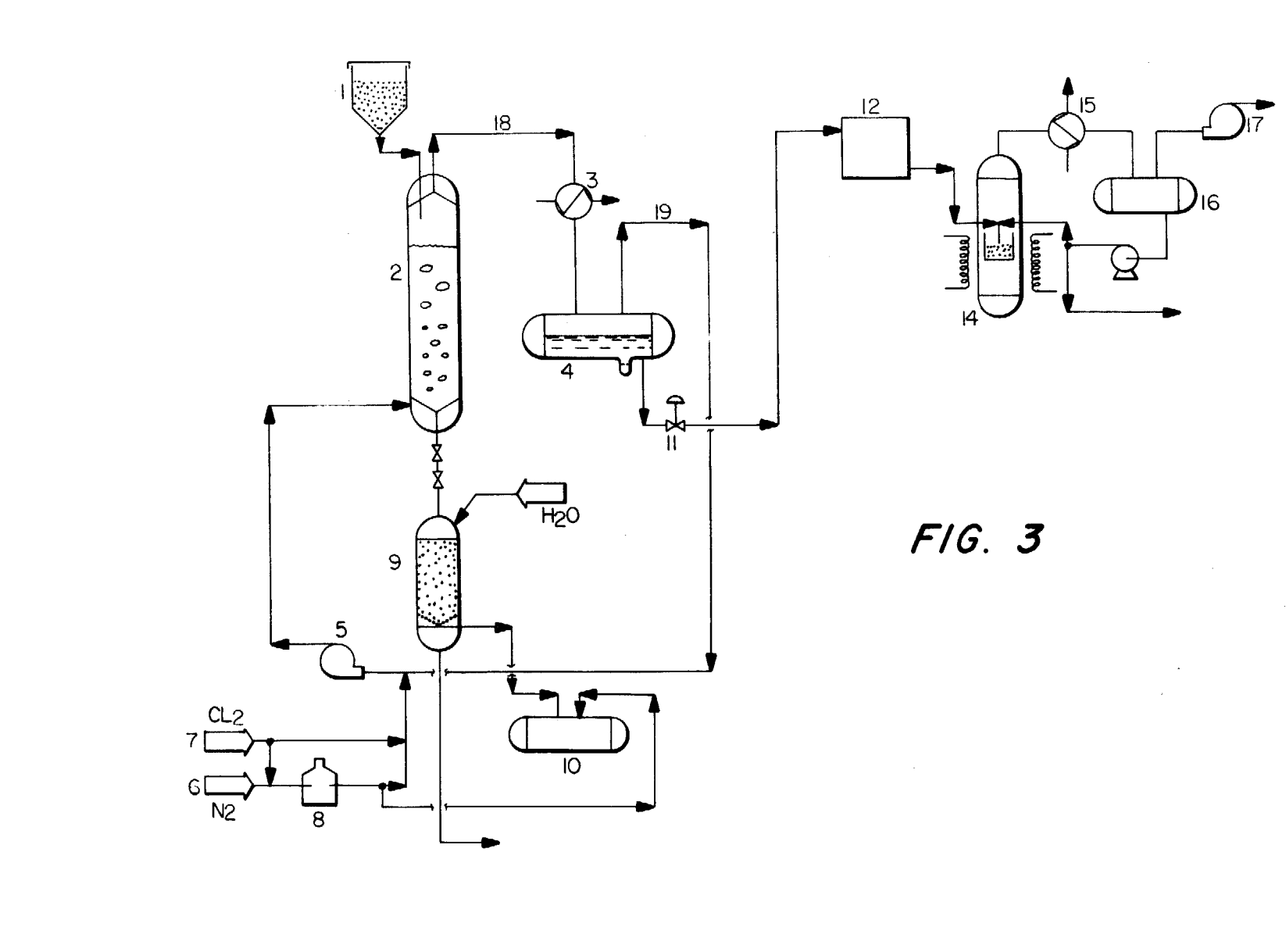
FIG. 3 is a schematic representation of an apparatus which is useful for practicing the invention.

With reference to FIG. 3 this invention will be explained in more detail below.

The spent catalyst discharged from a reactor for hydrogenation treatment or the like is first stored in storage 1, and when some quantity of it has collected therein it is fed to chlorination reactor 2, wherein it is chlorinated. In the case where an appreciable amount of raw material oil such as heavy oil, etc. is adhered on said spent catalyst it is desirable to completely remove such oil before the chlorination by the use of solvent, etc. After the catalyst fed to chlorination reactor 2 has been thoroughly dried by sending by meand of blower 5 inert gas 6 such as $N_2$, etc. which is heated to, say, from 350° to 400° C. by means of heating furnace 8, it is chlorinated with chlorinating agent 7 such as chlorine gas, etc. sent in by means of blower 5 at the temperature which was beforehand set up according to the nature of the metal compounds accumulated on said spent catalyst.

Since the chlorination reaction takes place with a violent exotherm, the temperature in reactor 2 is controlled by adjusting the flow rate ratio of inert gas 6. Substantially all the amount of vanadium sulfide accumulated on the spent catalyst is vaporized as vanadium tetrachloride by virtue of the chlorination reaction, and is discharged from reactor 2 passing overhead through line 18. According to the reaction temperature in chlorination the discharged vapor may contain molybdenum pentachloride, aluminum trichloride, or ferric chloride in addition to vanadium tetrachloride and disulfurdichloride.

The vapor discharged through line 18 is cooled to, say, from 30° to 50° C. by means of cooler 3 and then sent to vapor liquid separator 4. Not to speak of vanadium tetrachloride, all the metallic chlorides such as molybdenum pentachloride, aluminum trichloride, or ferric chloride, are liquefied along with disulfur dichloride, leaving unreacted chloride gas and inert gas alone in the gaseous phase. Accordingly, the vapor separated in vapor-liquid separator 4 is circulated for reuse to chlorination reactor 2 through line 19.

On the other hand, the liquid components separated from gaseous components are led through control valve 11 to tank 12, where they are stored and cooled. The cooled liquid is further sent to retort 14, where it is heated to, say, from 150° to 200° C. under reduced pressure. Within several hours almost all of $VCl_4$ undergoes thermal decomposition becoming purple solid $VCl_3$. In this case, unreacted $VCl_4$ and $S_2Cl_2$ which evaporate are liquefied in cooler 15, and after they have been separated in vapor-liquid separator 16 from the chlorine gas formed in the decomposition they are recycled to retort 14, where $VCl_4$ is completely converted to $VCl_3$. If the components within the receptacle in retort 14 which have already been solidified are further heated to, say, 300°–400° C. under reduced pressure, all the impurities such as $S_2Cl_2$, $MoCl_5$, $AlCl_3$, $FeCl_3$, etc. that are coexistent with $VCl_3$ are readily capable of vapor solid separation, so that $VCl_3$ alone can be recovered in a purity more than 99.9%.

From $VCl_3$ thus recovered metallic vanadium can be recovered according to the prior known molten salt electrolytic process.

Now, referring to nickel sulfide accumulated on the spent catalyst, it is also readily chlorinated in chlorination reactor 2, and in one example at 200° C. it was shown that about 94% by weight of nickel could be chlorinated.

Since the nickel compound chlorinated remains as it is on the spent catalyst, all the amount of spent catalyst is transferred to extractor 9 after the chlorination is complete, and hot water is added thereto at a temperature below 100° C. to extract the nickel compound as an aqueous solution of nickel chloride, which is subsequently evaporated to dryness in oven 10 in the presence of inert gas such as $N_2$, etc. From the nickel chloride thus obtained metallic nickel can be recovered according to the prior known molten salt electrolytic process.

EXAMPLE 1

The composition of the spent catalyst used in the hydrogenation treatment of Boscan crude oil under the following reaction conditions is as shown in Table 1.
Hydrogenation conditions:
Reaction temperature: 410° C.
Reaction pressure: 140 Kg/cm²G
LHSV: 0.3 hr⁻¹
Process time: 1,000 hrs Table 1

| Composition of spent catalyst | | |
|---|---|---|
| $SiO_2$ | 21 | % by weight |
| MgO | 9 | " |
| V | 30 | " |
| Ni | 8 | " |
| S | 28 | " |
| Fe | 0.5 | " |
| The rest | 3.5 | " |

After this spent catalyst had been washed at 150° C. for 24 hours by the use of a mixed oil: carbon tetrachloride/kerosene = ¼ it was chlorinated under the following chlorination conditions, with the metal recovery being shown in Table 2.
Chlorination conditions:
Amount of spent catalyst: 100 cc
Chlorination temperature: 200° C.
Chlorination pressure: atmospheric
Flow rate of chlorine gas: 50 l/hr
Flow rate of carbon tetrachloride: 18 cc/hr (as liquid)

Table 2

| Metal recovery | | |
|---|---|---|
| V | 60 | % by weight |
| Ni | 65 | " |
| Mg | 0 | " |

EXAMPLE 2

The oil-purged spent catalyst which was quite the same as that in Example 1 was chlorinated under the following chlorination conditions with the metal recovery obtained being shown in Table 3.

Chlorination conditions:
  Amount of spent catalyst: 100 cc
  Chlorination temperature: 400° C.
  Chlorination pressure: atmospheric
  Flow rate of chlorine gas: 50 l/hr
  Flow rate of carbon tetrachloride: 18 cc/hr (as liquid)

Table 3

| Metal recovery | | |
|---|---|---|
| V | 89 | % by weight |
| Ni | 93 | " |
| Mg | 1 | " |

EXAMPLE 3

The oil-purged spent catalyst which was quite the same as that in Example 1 was chlorinated under the following chlorination conditions with the metal recovery obtained being shown in Table 4.

Chlorination conditions:
  Amount of spent catalyst: 100 cc
  Chlorination temperature: 400° C.
  Chlorination pressure: atmospheric
  Flow rate of chlorine gas: 100 l/hr Table 4

| Metal recovery | | |
|---|---|---|
| V | 75 | % by weight |
| Ni | 82 | " |
| Mg | — | |

For comparison purpose the result of the chlorination which was carried out after calcination is shown below as Comparative Example.

COMPARATIVE EXAMPLE

The composition of the spent catalyst used in hydrogenation treatment of Boscan crude oil under the following reaction conditions is as shown in Table 5.

Hydrogenation conditions:
  Reaction temperature: 410° C.
  Reaction pressure: 140 Kg/cm²G
  LHSV: 1.0 hr⁻¹
  Process time: 5,000 hrs Table 5

| Composition of spent catalyst | | |
|---|---|---|
| $SiO_2$ | 21 | % by weight |
| MgO | 9 | " |
| V | 30 | " |
| Ni | 8 | " |
| S | 28 | " |
| Fe | 0.5 | " |
| The rest | 3.5 | " |

The composition of the spent catalyst which was obtained by calcining the spent catalyst in Table 1 under the following calcination conditions is as shown in Table 6.

Calcination conditions:
  Calcination temperature: 600° C.
  Calcination pressure: atmospheric
  Calcination time: 5 hrs The calcination was carried out cautiously so as not to make the temperature higher than 600° C. using steam as a diluting gas.

Table 6

| Composition of spent catalyst after calcination | | |
|---|---|---|
| $SiO_2$ | 21 | % by weight |
| MgO | 9 | " |
| V | 30 | " |
| Ni | 8 | " |
| Fe | 0.5 | " |
| The rest | 31.5 | " |

What is designated herein as the rest is substantially oxygen.

When the calcined spent catalyst was chlorinated under the following chlorination conditions in admixture with active charcoal the metal recovery obtained was as shown in Table 7.

Chlorination conditions:
  Amount of spent catalyst: 100 cc
  Active charcoal: 70 gr
  Chlorination temperature: 550° C.
  Chlorination pressure: atmospheric
  Flow rate of chlorine gas: 50 l/hr
  Flow rate of carbon tetrachloride: 18 cc/hr (as liquid)

Table 7

| Metal recovery | | |
|---|---|---|
| V | 17 | % by weight |
| Ni | 20 | " |
| Mg | 28 | " |

The vapor formed was analyzed after liquefaction by cooling. The result is shown in Table 8.

Table 8

| Analysis of vapor formed | | |
|---|---|---|
| $VOCl_3$ | 78 | % by weight |
| $VCl_4$ | 18 | " |
| The rest | 4 | " |

As shown in Table 8 the main component of the vapor formed is vanadium oxytrichloride, and it is also found that the recovery of vanadium is considerably low.

EXAMPLE 4

The composition of the spent catalyst used in hydrogenation treatment of Iranian heavy vacuum residue under the following reaction conditions is as shown in Table 9.

Hydrogenation conditions:
  Reaction temperature: 370–410° C.
  Reaction pressure: 140 Kg/cm²G
  LHSV: 0.25 hr⁻¹
  Process time: 4,300 hrs Table 9

| Composition of spent catalyst | | |
|---|---|---|
| $SiO_2$ | 24.7 | % by weight |
| MgO | 9.8 | " |
| V | 28.2 | " |
| Ni | 2.8 | " |
| Mo | 1.5 | " |
| Fe | 0.2 | " |
| S | 24.6 | " |
| C | 4.9 | " |

Table 9-continued

| Composition of spent catalyst | | |
|---|---|---|
| The rest | 3.9 | " |

The sample of this spent catalyst which was washed at 100° C. for 24 hours by the use of a mixed oil: benzene/kerosene = ¼, and then dried under an atmosphere of nitrogen at 450° C. for 3 hours, was chlorinated under the following chlorination conditions with the metal recovery obtained being shown in Table 10.

Chlorination conditions:
Amount of spent catalyst: 100 cc
Chlorination temperature: 50° C.
Chlorination pressure: atmospheric
Flow rate of chlorine gas: 4.5 m³/hr

Table 10

| Metal recovery | | |
|---|---|---|
| V | 71 | % by weight |
| Ni | 60 | " |
| Mo | <1.2 | " |
| Fe | 0 | " |
| Al | 0 | " |
| S | 65 | " |

The vapor separated from the spent catalyst by vapor-liquid separation after chlorination was liquefied by cooling, and by the IR absorption spectrum of its sample it was confirmed that the liquid was composed of $VCl_4$ and $S_2Cl_2$.

EXAMPLE 5

The oil-purged spent catalyst which was quite the same as that in Example 4 was chlorinated under the following chlorination conditions with the metal recovery obtained being shown in Table 11.

Chlorination conditions:
Amount of spent catalyst: 100 cc
Chlorination temperature: 100° C.
Chlorination pressure: atmospheric
Flow rate of chlorine gas: 4.5 m³/hr (partial pressure 0.5 atm)
Flow rate of helium gas: 4.5 m³/hr

Table 11

| Metal recovery | | |
|---|---|---|
| V | 84.0 | % by weight |
| Ni | 80.0 | " |
| Mo | <1.2 | " |
| Fe | 0 | " |
| Al | 0 | " |
| S | 81 | " |

EXAMPLE 6

The composition of the spent catalyst used in hydrogenation treatment of Kuwait atmospheric pressure residue under the following reaction conditions is as shown in Table 12.

Hydrogenation conditions:
Reaction temperature: 360°–410° C.
Reaction pressure: 140 Kg/cm²G
LHSV: 0.5 hr⁻¹
Process time: 4,300 hrs

Table 12

| Composition of spent catalyst | | |
|---|---|---|
| $SiO_2$ | 12.0 | % by weight |
| $Al_2O_3$ | 30.3 | " |

Table 12-continued

| Composition of spent catalyst | | |
|---|---|---|
| V | 18.8 | " |
| Ni | 3.3 | " |
| Mo | 4.9 | " |
| Fe | 0.6 | " |
| S | 17.0 | " |
| C | 9.1 | " |
| The rest | 4.0 | " |

The sample of this spent catalyst which was washed at 150° C. for 24 hours by the use of a mixed oil: carbon tetrachloride/kerosene = ¼ was chlorinated under the following chlorination conditions with the metal recovery obtained being shown in Table 13.

Chlorination conditions:
Amount of spent catalyst: 100 cc
Chlorination temperature: 300° C.
Chlorination pressure: atmospheric
Flow rate of chlorine gas: 3.0 m³/hr

Table 13

| Metal recovery | | |
|---|---|---|
| V | 78 | % by weight |
| Ni | 100 | " |
| Mo | 64 | " |
| S | 93 | " |
| Fe | 17 | " |
| Al | 17 | " |
| Si | 0 | " |

By subjecting the spent catalyst after chlorination to hot extraction with water at 80° C. nickel was readily recovered as an aqueous solution of nickel chloride, which was further evaporated to dryness under an atmosphere of nitrogen and 95% purity of $NiCl_2$ was obtained.

The above described spent catalyst after chlorination was also extracted with ethanol, whereby substantially all the nickel chloride could be dissolved out. Subsequently by heating and evaporating to dryness the extract $NiCl_2$ was recovered.

Figure 4:
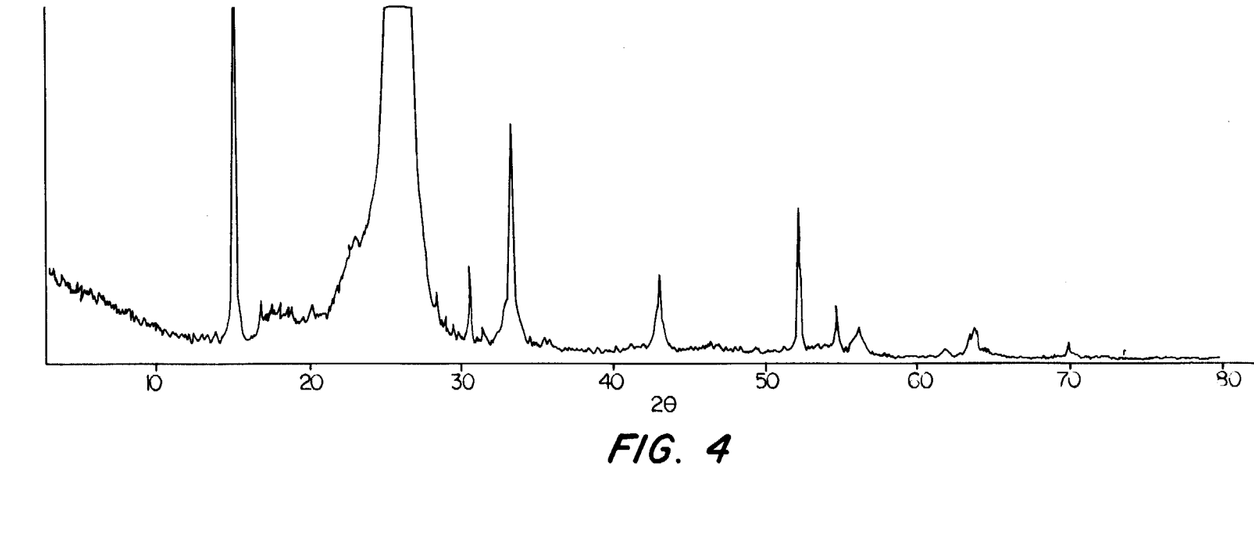
FIG. 4 indicates the x-ray diffraction pattern of $VCl_3$ recovered in example 6.

On the other hand, the vapor separated from the spent catalyst by vapor-solid separation after chlorination was analyzed as follows.
V: 15.94% by weight
Mo: 3.36 by weight
Fe: 0.11 by weight
Al: 0.35 by weight
S: 13.32 by weight
Cl: 66.90 by weight The liquefied sample having the above described composition was charged in a retort equipped with a water cooler, and heated to 150–200° C. under the condition of total condensation at reduced pressure, whereby the thermal decomposition of vanadium tetrachloride took place over a period of several hours. When fully decomposed, the cooling by the water cooler was ceased, and the liquid material was evaporated by evacuating the retort for 1–2 hours, and by further evacuation at 350–400° C. for 1–2 hours all the liquid material such as $S_2Cl_2$ etc. was completely removed. The purple material in the retort was analyzed to be 99.9% purity of vanadium trichloride. FIG. 4 indicates the X-ray diffraction pattern of the vanadium trichloride. In addition, the rate of recovery of vanadium was 85%.

When the above described liquefied sample which was substantially a mixture of vanadium tetrachloride and disulfur dichloride was cooled to −50° C., it was found that vanadium tetrachloride began to solidify at −30° C., to be separated from $S_2Cl_2$ by solid-liquid separation. Also when the cooling was made to −50° C. in the coexistence of carbon bisulfide solvent, it resulted in better achievement of said solid-liquid separation between $VCl_4$ and $S_2Cl_2$.

Further by carrying out the thermal decomposition as above described with respect to the product of the foregoing fractional crystallization which was substantially vanadium tetrachloride the purity of the vanadium trichloride obtained could be much improved.

On the other hand, when the above described liquefied sample which was substantially a mixture of vanadium tetrachloride and disulfur dichloride was also subjected to distillation while blowing chlorine gas in an amount equivalent to the total amount of vanadium tetrachloride and disulfur dichloride thereinto from the tower bottom at an overhead temperature of 160° C. under a chlorine pressure of 10 atm., vanadium tetrachloride could be separated from disulfur dichloride in a satisfactory manner. By a similar thermal decomposition of the product of this distillation under chlorine pressure which was substantially vanadium tetrachloride the purity of the vanadium trichloride obtained could be much improved.

What is claimed is:

1. A process for recovering vanadium accumulated on spent catalysts, the vanadium being recovered as a chloride thereof, which process comprises chlorinating a spent catalyst which has not been subjected to prior oxidation and having vanadium accumulated thereon substantially in the form of sulfides with a chlorinating agent selected from the group consisting of chlorine, hydrogen chloride, carbon tetrachloride, $S_2Cl_2$ and mixtures thereof under a temperature of from room temperature to 600° C. and a pressure above atmospheric so that substantially all of the vanadium accumulated on said spent catalyst can be chlorinated to a volatile chloride which is mainly vanadium tetrachloride.

2. The process as defined in claim 1, wherein said chlorinating agent is chlorine gas.

3. The process as defined in claim 1, wherein said chlorination temperature is from room temperature to 200° C.

4. The process as defined in claim 1, wherein said chlorinating agent is chlorine gas, and said chlorination temperature is from room temperature to 200° C.

5. The process as defined in claim 1, wherein said spent catalyst is one or a mixture of catalysts that have been used in a process of hydrodesulfurization, hydrodemetallization, or hydrocracking of heavy hydrocarbon oils.

6. A process for recovering vanadium accumulated on spent catalysts, the vanadium being recovered as a chloride thereof, which process comprises chlorinating a spent catalyst which has not been subjected to prior oxidation and having vanadium accumulated thereon substantially in the form of sulfides with a chlorinating agent selected from the group consisting of chlorine, hydrogen chloride, carbon tetrachloride, $S_2Cl_2$ and mixtures thereof, under a temperature of from room temperature to 600° C. and a pressure above atmospheric so that substantially all of the vanadium accumulated on said spent catalyst can be chlorinated to a volatile chloride which is mainly vanadium tetrachloride, and thereafter separating said volatile chloride from said spent catalyst and further purifying it from contaminants thereof.

7. The process as defined in claim 6, wherein said chlorinating agent is chlorine gas.

8. The process as defined in claim 6, wherein said chlorination temperature is from room temperature to 200° C.

9. The process as defined in claim 6, wherein said chlorinating agent is chlorine gas and said chlorination temperature is from room temperature to 200° C.

10. The process as defined in claim 6, wherein said spent catalyst is one or a mixture of catalysts that have been used in a process of hydrodesulfurization, hydrodemetallization, or hydrocracking of heavy hydrocarbon oils.

11. The process as defined in claim 10, wherein chlorine gas recovered during the intermediate course of the process wherein said volatile vanadium chloride is separated from said spent catalyst and further purified from contaminants thereof, is reused as one portion of the chlorinating agent.

12. The process as defined in claim 6, wherein said purification of vanadium chloride from contaminants thereof is carried out by liquefying the vapor recovered from the step of chlorination to effect vapor-liquid separation.

13. The process as defined in claim 12, wherein the liquid obtained by said liquefaction is further subjected to distillation under chlorine pressure under such temperature condition that vanadium tetrachloride does not undergo thermal decomposition into vanadium trichloride.

14. The process as defined in claim 12, wherein the liquid obtained by said vapor-liquid separation is further cooled to −26°−−76° C. so as to recover vanadium tetrachloride as a solid.

15. The process as defined in claim 12, wherein the liquid obtained by liquefaction or liquefaction and distillation under chlorine pressure is further heated to 50° C. or more under reduced pressure so that the vanadium tetrachloride is converted to vanadium trichloride which is recovered as a solid, and thereafter the $S_2Cl_2$ contained in said liquid is separated as a gas.

16. A process for recovering vanadium and nickel accumulated on spent catalysts as chlorides thereof which comprises recovering said vanadium as vanadium chloride according to the process as defined in claim 1, and then recovering said nickel as nickel chloride by the solvent extraction of said spent catalysts from which vanadium has already been removed.

17. The process as defined in claim 1 or 6, wherein the chlorinating of the spent catalyst is conducted in an inert atmosphere.

18. A process for recovering vanadium and nickel accumulated on spent catalysts as chlorides thereof which comprises recovering said vanadium as vanadium chloride according to the process as defined in claim 6, and then recovering said nickel as nickel chloride by the solvent extraction of said spent catalysts from which the vanadium has already been removed.

19. The process as defined in claim 1 wherein said spent catalyst contains more than about 2% by weight of vanadium.

20. The process as defined in claim 6 wherein said spent catalyst contains more than about 2% by weight of vanadium.

* * * * *